United States Patent
Tsukamura et al.

(10) Patent No.: US 6,963,660 B1
(45) Date of Patent: Nov. 8, 2005

(54) FINGERPRINT COLLATING DEVICE AND FINGERPRINT COLLATING METHOD

(75) Inventors: Yoshihiro Tsukamura, Kanagawa (JP); Takeshi Funahashi, Saitama (JP)

(73) Assignee: Sony Corporation, (JP)

( * ) Notice: Subject to any disclaimer, the term of this patent is extended or adjusted under 35 U.S.C. 154(b) by 700 days.

(21) Appl. No.: 09/639,171

(22) Filed: Aug. 16, 2000

(30) Foreign Application Priority Data

Aug. 18, 1999 (JP) ................. P11-231683

(51) Int. Cl.[7] .............. G06K 9/00; G06F 7/04
(52) U.S. Cl. ........ 382/124; 382/127; 340/5.53; 340/5.83; 348/161
(58) Field of Search ......... 382/115, 116, 117, 382/118, 119, 120, 121, 122, 123, 124, 125; 340/5.53, 5.83; 348/161

(56) References Cited

U.S. PATENT DOCUMENTS

| | | | |
|---|---|---|---|
| 3,533,823 A * | 10/1970 | Newkirk et al. ............... 427/1 |
| 3,619,060 A * | 11/1971 | Johnson ....................... 356/71 |
| 4,650,978 A * | 3/1987 | Hudson et al. ............. 235/380 |
| 5,180,901 A * | 1/1993 | Hiramatsu .................. 235/380 |
| 5,493,621 A * | 2/1996 | Matsumura ................. 382/125 |
| 5,618,232 A * | 4/1997 | Martin ......................... 463/25 |
| 5,664,126 A * | 9/1997 | Hirakawa et al. ........... 345/751 |
| 5,719,950 A * | 2/1998 | Osten et al. ................ 382/115 |
| 5,903,225 A * | 5/1999 | Schmitt et al. ............ 340/5.25 |
| 6,195,447 B1 * | 2/2001 | Ross ........................... 382/125 |
| 6,241,288 B1 * | 6/2001 | Bergenek et al. ............. 283/67 |
| 6,400,836 B2 * | 6/2002 | Senior ......................... 382/124 |
| 6,438,257 B1 * | 8/2002 | Morimura et al. .......... 382/124 |
| 6,490,366 B1 * | 12/2002 | Haneda et al. .............. 382/126 |
| 6,647,133 B1 * | 11/2003 | Morita et al. ............... 382/124 |

FOREIGN PATENT DOCUMENTS

| | | | |
|---|---|---|---|
| JP | 2000-067236 | 3/2000 |
| JP | 2001056858 A * | 2/2001 | ............ G06T 7/00 |

* cited by examiner

*Primary Examiner*—Jingge Wu
*Assistant Examiner*—Ryan J. Hesseltine
(74) *Attorney, Agent, or Firm*—Rader, Fishman & Grauer PLLC; Ronald P. Kananen

(57) ABSTRACT

A fingerprint collating device and a fingerprint collating method which can prevent an illicit use of fingerprint. The fingerprint collating device includes fingerprint reader for reading a user's fingerprint to create read fingerprint information, and to create read history information indicating that the read fingerprint information has been created, read history storage for storing the read history information, and collator for collating the read fingerprint information with the registered fingerprint information to effect personal authentication and output a result of authentication when the read history information is stored in the read history storage.

19 Claims, 3 Drawing Sheets

FINGERPRINT COLLATING DEVICE AND FINGERPRINT COLLATING METHOD

BACKGROUND OF THE INVENTION

1. Field of the Invention

The present invention relates to a fingerprint collating device and a fingerprint collating method, and more particularly, is suitably applied to a fingerprint collating device to effect personal authentication by using the fingerprint, for example.

2. Description of the Related Art

Conventionally, there is a fingerprint collating unit for effecting personal authentication by using the fingerprint. Such fingerprint collating unit uses an image pick-up element to photograph a user's fingerprint, and produce a fingerprint image. And the fingerprint collating unit collates the photographed fingerprint image with the registered fingerprint image for collation to effect personal authentication. The fingerprint is unchanged throughout one's life and different from person to person. Therefore, the fingerprint can securely assure the personal authentication.

However, the third party may pick up the other's fingerprint from a cup or the like, for example, to falsify a fingerprint image, and enter the falsified fingerprint image into the fingerprint collating unit for the fingerprint collation. The third party may abuse the falsified fingerprint for personal authentication.

SUMMARY OF THE INVENTION

In view of the foregoing, an object of this invention is to provide a fingerprint collating device and a fingerprint collating method which can prevent an illicit use of the other's fingerprint.

The foregoing object and other objects of the invention have been achieved by the provision of a fingerprint collating device for collating a user's fingerprint the registered fingerprint information to effect personal authentication, comprising fingerprint reader for reading the user's fingerprint to create read fingerprint information, and to create read history information indicating that the read fingerprint information has been created, read history storage for storing the read history information, and collator for collating the read fingerprint information with the registered fingerprint information to effect personal authentication and output a result of authentication when the read history information is stored in the read history storage.

The read history information indicating that the read fingerprint information has been created is stored in the read history storage, and the read fingerprint information is collated with the registered fingerprint information to effect personal authentication when the read history information is stored in the read history storage. Therefore, even if the read fingerprint information is improperly entered from the outside, the personal authentication is not effected, leading to prevention of an illicit use.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Overall Configuration of a Fingerprint Collation System

Figure 1:
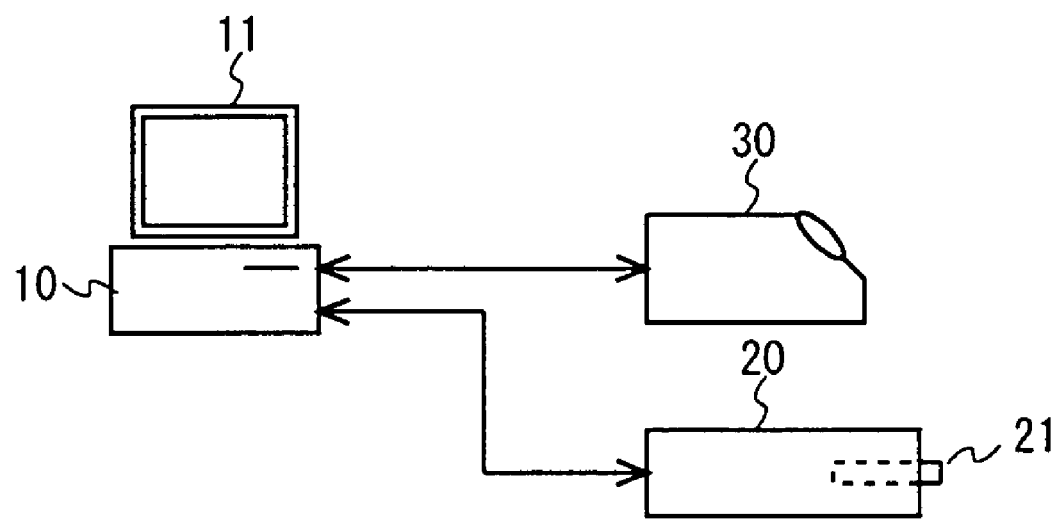
FIG. 1 is a block diagram showing the configuration of a fingerprint collation system according to the present invention.

In FIG. 1, reference numeral 1 denotes a fingerprint collation system of the invention as a whole, in which a card reader 20 for reading or writing data from or to an Integrated Circuit (IC) card 21 and a fingerprint collating unit 30 as a fingerprint collating device are connected to a personal computer 10. The personal computer 10 is connected to the card reader 20, as well as the fingerprint collating unit 30, via an RS-232C serial interface.

The fingerprint collating unit 30 accepts a user's fingerprint, and collates the fingerprint with either a fingerprint template (reference fingerprint data for the person for authentication) registered in the fingerprint collating unit 30 or a fingerprint template registered in the IC card 21, a result of fingerprint collation being output to the personal computer 10.

The fingerprint collating unit 30 has a plurality of fingerprint templates registered, each fingerprint template being identified by an index number N index. Also, the IC card 21 has a fingerprint template of an owner of the IC card 21 registered.

(2) Fingerprint Registration Process

When the fingerprint of a person for authentication is registered in the fingerprint collating unit 30, the personal computer 10 sends a fingerprint registration instruction Reg and an index number N index specified by the user to the fingerprint collating unit 30 in response to the fingerprint registration operation of the user.

Figure 2:
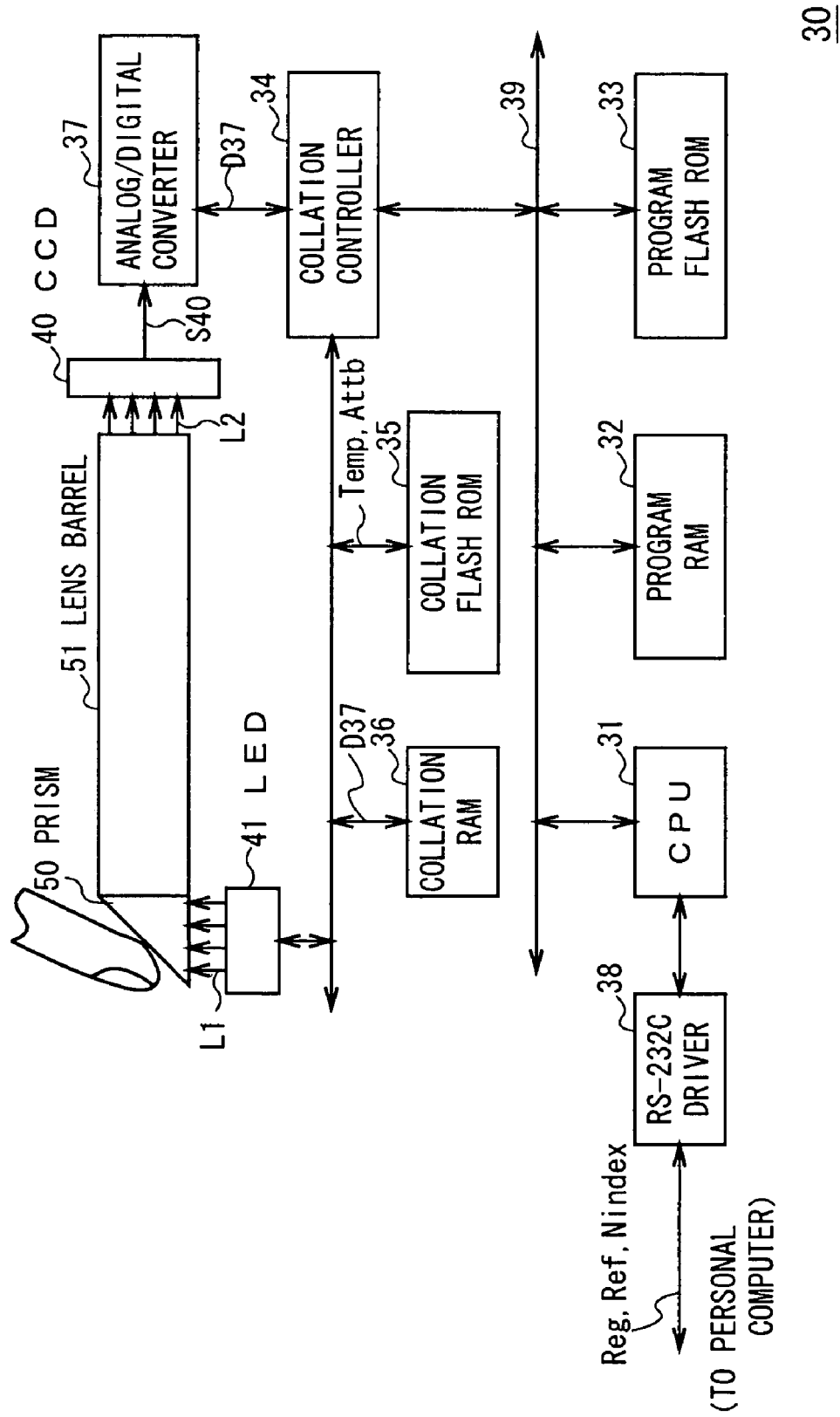
FIG. 2 is a block diagram showing the configuration of a fingerprint collating unit.

FIG. 2 is a diagram of the fingerprint collating unit 30 as a whole. A CPU 31, a program Random Access Memory (RAM) 32, a program flash Read Only Memory (ROM) 33, and a collation controller 34 are connected to a main bus 39. The CPU 31 reads a control program from the program flash ROM 33 and executes the control program in the program RAM 32 to control the whole of the fingerprint collating unit 30.

That is, the CPU 31 receives the fingerprint registration instruction Reg and the index number N index sent from the personal computer 10 via a RS232C driver 38. And the CPU 31 controls the collation controller 34 in accordance with the fingerprint registration instruction Reg to start reading the fingerprint.

The collation controller 34 turns on an LED 41 under the control of the CPU 31 to apply an illuminating light L1 onto the bottom face of a prism 50. Then, the user puts one's finger with fingerprint face to be registered on the slant of the prism 50 firmly.

The prism 50 reflects the illuminating light L1 on the interior of the slant of prism to cause a reflected light L2 to be outgoing via a lens (not shown) provided within a lens barrel 51 to a Charge Coupled Device (CCD) 40. The prism 50 reflects totally the illuminating light L1, when there is an air layer on the outer face of the slant, while diffusing the illuminating light L1, when there is no air layer on the outer face of the slant. Therefore, when the user puts one's finger with fingerprint face firmly on the slant of the prism 50, the illuminating light L1 is reflected at a concave portion of the fingerprint due to the presence of air layer, while being diffused at a convex portion of the fingerprint due to the absence of air layer. Consequently, the reflected light L2 results in an image which is bright in the concave portion of fingerprint and dark in the convex portion of fingerprint. The CCD 40 produces an image signal S40 by picking up the reflected light L2, and outputs the image signal S40 to an analog/digital converter 37. In this way, the fingerprint is optically read.

The analog/digital converter 37 converts the image signal S40 into a digital signal, which is binarized and output as the fingerprint image data D37 to the collation controller 34. At this time, the collation controller 34 displays the fingerprint image data D37 via the RS232C driver 38 on a monitor 11 of the personal computer 10 (FIG. 1). Thereby, the user confirms one's own fingerprint photographed to adjust the disposition of the finger with respect to the prism 50.

Figure 3:
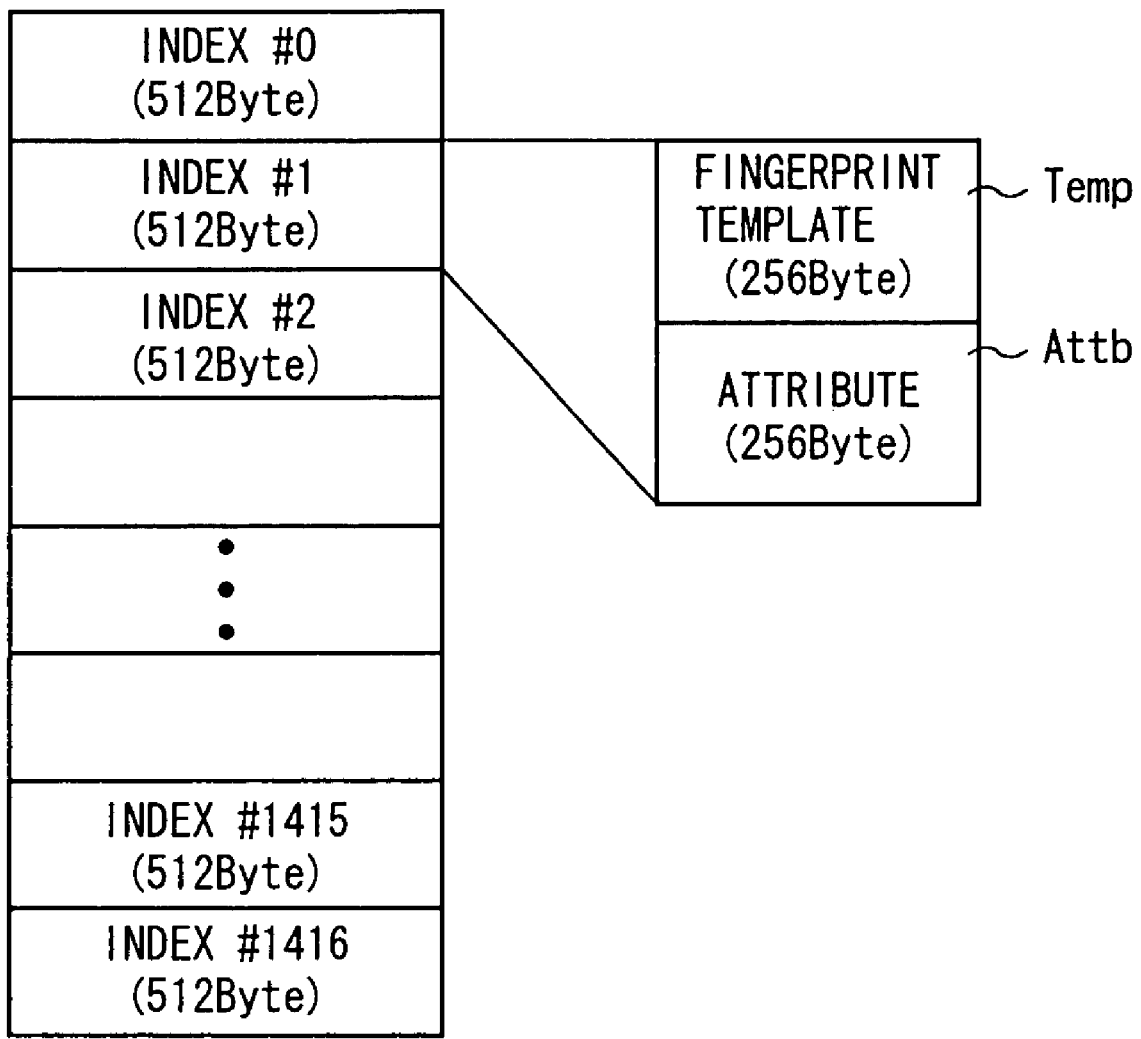
FIG. 3 is a diagram showing a stored state of fingerprint data.

The collation controller 34 extracts the feature points of fingerprint (central or branch point of fingerprint pattern) from the fingerprint image data D37 to produce a fingerprint template Temp. And the collation controller 34 registers the fingerprint template Temp and an attribute Attb associated with the fingerprint template Temp at an index (address) specified by the index number N index within the collation flash ROM 35, as shown in FIG. 3, and notifies the personal computer 10 that the registration of fingerprint has been completed (FIG. 1).

(3) Fingerprint Collation Process (3-1) Fingerprint Collation Process with Fingerprint Template within Fingerprint Collating Unit When the fingerprint collation is performed by using a fingerprint template Temp registered within the fingerprint collating unit 30, the user uses the personal computer 10 to start a fingerprint collation process and input an index number N index. The personal computer 10 sends a fingerprint collation instruction Ref and the index number N index specified by the user to the fingerprint collating unit 30 in response to this.

In FIG. 2, the CPU 31 receives the fingerprint collation instruction Ref and the index number N index sent from the personal computer 10 via the RS232C driver 38, controls the collation controller 34 in accordance with the fingerprint collation instruction Ref to start reading the fingerprint.

The collation controller 34 turns on the LED 41 under the control of the CPU 31, like when registering the fingerprint, and applies an illuminating light L1 on the bottom face of the prism 50. At this time, the user puts one's finger with fingerprint face on the slant of the prism 50 firmly.

The prism 50 reflects the illuminating light L1 at the interior of the slant of prism, and causes the reflected light L2 representing the user's fingerprint image to be outgoing via a lens (not shown) provided within the lens barrel 51 to the CCD 40 which is fingerprint reading means. The CCD 40 picks up the reflected light L2 to produce an image signal S40 for output to the analog/digital converter 37. The analog/digital converter 37 converts the image signal S40 into a digital signal, which is binarized and output as the fingerprint image data D37 to the collation controller 34.

Here, when the fingerprint image data D37 is normally produced, the collation controller 34 which is fingerprint reading means sets a fingerprint accepting flag as reading history information indicating that the fingerprint has been read in the program RAM 32 which is reading history storing means.

And the collation controller 34 as collating means reads the fingerprint template Temp specified by the index number N index from the collation flash ROM 35 and collates the fingerprint image data D37 with the read fingerprint template Temp.

At this time, the collation controller 34 executes the collation between the fingerprint template Temp and the fingerprint image data D37, only when the fingerprint accepting flag has been set in the program RAM 32, but does not execute the collation when the fingerprint accepting flag has not been set in the program RAM 32. Namely, the fingerprint collating unit 30 performs the collation of fingerprint only with the fingerprint image data D37 read by the fingerprint collating unit 30, but does not perform the collation of fingerprint even if the fingerprint image data D37 is input externally. Thereby, it is possible to prevent an illicit use of fingerprint, using the falsified fingerprint image data.

After the collation between the fingerprint template Temp and the fingerprint image data D37 has been completed, the collation controller 34 resets the fingerprint accepting flag in the program RAM 32, and outputs a result of collation to the personal computer 10 (FIG. 1).

(3-2) Fingerprint Collation Process with Fingerprint Template within IC Card

When the collation of fingerprint is made using the fingerprint template Temp registered within the IC card 21, the user inserts the IC card 21 into the card reader 20, and uses the personal computer 10 to start the fingerprint collation operation. The personal computer 10 sends a fingerprint collation instruction Ref to the fingerprint collating unit 30 in response to this.

The CPU 31 (FIG. 2) controls the collation controller 34 in accordance with the fingerprint collation instruction Ref to start reading the fingerprint. The collation controller 34 reads a user's fingerprint to produce the fingerprint image data D37 and store it in the collation RAM 36 under the control of the CPU 31, like when registering the fingerprint. Herein, when the fingerprint image data D37 can be normally produced, the collation controller 34 sets the fingerprint accepting flag indicating that the fingerprint has been read in the program RAM 32.

The collation controller 34 reads the fingerprint template Temp registered within the IC card 21 via the personal computer 10, and stores the fingerprint template Temp at an index #0 in the collation flash ROM 35. And the collation controller 34 reads the fingerprint template Temp from the index #0 in the collation flash ROM 35, and performs the collation between the fingerprint template Temp and the fingerprint image data D37.

At this time, the collation controller 34 executes the collation between the fingerprint template Temp and the fingerprint image data D37, only when the fingerprint accepting flag has been set in the program RAM 32, but does not execute the collation when the fingerprint accepting flag has not been set in the program RAM 32.

After the collation between the fingerprint template Temp and the fingerprint image data D37 has been completed, the collation controller 34 resets the fingerprint accepting flag in the program RAM 32, and outputs a result of collation to the personal computer 10 (FIG. 1).

(4) Operation and Effect

In the above configuration, the fingerprint collating unit 30 accepts a user's fingerprint to produce the fingerprint image data D37. At this time, when the fingerprint image data D37 is normally produced, the collation controller 34 sets the fingerprint accepting flag in the program RAM 32.

And the collation controller 34 performs the collation between the fingerprint template Temp within the fingerprint collating unit 30 or the IC card 21 and the fingerprint image data D37, only when the fingerprint accepting flag has been set in the program RAM 32.

With the above configuration, the fingerprint accepting flag is set when the user's fingerprint is accepted to produce the fingerprint image data D37. Only when the fingerprint accepting flag has been set, the collation of fingerprint is performed. Therefore, even if the fingerprint image data D37 is entered externally into the fingerprint collating unit 30, the collation of fingerprint is not performed. Consequently, it is possible to prevent an illicit use of fingerprint, using the falsified fingerprint image data.

As described above, according to the present invention, the read history information representing that the read fingerprint information has been produced is stored in the read history storing means. When the read history information is stored in the read history storing means, the collation between the read fingerprint information and the registered fingerprint information is performed to effect personal authentication. Even if the read fingerprint information is entered externally and illicitly, the personal authentication is not performed. Consequently, it is possible to provide the fingerprint collating device which can prevent an illicit use of fingerprint.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A fingerprint collating device for collating a user's fingerprint with registered fingerprint information to effect personal authentication, said device comprising:
    an external computer;
    a prism for reading said fingerprint to create read fingerprint information, and to create read history information indicating that said read fingerprint information has been created;
    a read history storage for storing said read history information and executing a control program when instructed by the external computer;
    a controller for setting a fingerprint accepting flag associated with said read fingerprint information indicating that read fingerprint information is normally produced through said prism; and
    a collator collating said read fingerprint information with said registered fingerprint information to effect personal authentication and output a result of authentication when said fingerprint accepting flag is set, said read history information is stored in said read history storage, and the control program is executed.

2. The fingerprint collating device according to claim 1, wherein said collator effects said personal authentication by using said registered fingerprint information supplied from an external storage medium, wherein said registered finger print information includes a finger print template that corresponds to an owner of the external storage medium.

3. A fingerprint collating method for collating a user's fingerprint with registered fingerprint information to effect personal authentication, said method comprising the steps of:
    reading said fingerprint through a prism to create read fingerprint information, and to create read history information indicating that said read fingerprint information has been created;
    storing said read history information in read history storing means;
    setting a fingerprint accepting flag associated with said read fingerprint information indicating that read fingerprint information is normally produced through the prism; and
    executing a control program in said read history storage means when an instruction signal is received from an external computer; and
    collating said read fingerprint information with said registered fingerprint information to effect personal authentication and output a result of authentication when said fingerprint accepting flag is set, said read history information is stored in said read history storing means, and said read history storage means executes the control program.

4. A fingerprint collating system comprising:
    means for generating a collation instruction and an index number;
    means for illuminating a bottom face of a prism based on the collation instruction;
    means for generating a fingerprint image of a user when an air layer exists between a finger of a user and a top face of the prism;
    means for setting a fingerprint accepting flag in a first memory unit when a fingerprint image of the user is normally produced through the prism;
    means for reading a fingerprint template associated with the index number from a second memory unit; and
    means for collating the fingerprint image and the fingerprint template when the fingerprint image of the user is generated and the fingerprint accepting flag is set.

5. The system of claim 4, further comprising:
    means for converting the fingerprint image to a digital signal.

6. The system of claim 4, further comprising:
    means for resetting the fingerprint accepting flag when the collation between the fingerprint image and the fingerprint template has been completed.

7. The system of claim 4, further comprising:
    means for outputting a result of the collation to a personal computer.

8. The system of claim 4, wherein the second memory unit is an IC card.

9. A method for collating a fingerprint in a fingerprint collating system that includes a personal computer and a collating unit, the method comprising:
    generating a collation instruction and an index number;
    illuminating a bottom face of a prism based on the collation instruction;
    generating a fingerprint image of a user when an air layer exists between a finger of a user and a top face of the prism;
    setting a fingerprint accepting flag in a first memory unit when a fingerprint image is normally produced through the prism;

reading a fingerprint template associated with the index number from a second memory unit; and collating the fingerprint image and the fingerprint template when the fingerprint image of the user is generated and the fingerprint accepting flag is set.

10. The method of claim 9, further comprising:
converting the fingerprint image to a digital signal.

11. The method of claim 9, further comprising:
resetting the fingerprint accepting flag when the collation between the fingerprint image and the fingerprint template is complete.

12. The method of claim 9, further comprising:
outputting a result of the collation to the computer.

13. A system for collating a fingerprint of a user, comprising:
- a computer that generates a fingerprint collation instruction and an index number, wherein the computer has a first memory unit;
- a prism that generates a fingerprint image of a user when the collation instruction is received from the computer and an air layer exists between a portion a finger of the user and a top face of the prism; and
- a collating unit that retrieves a fingerprint template of the user from a second memory unit based on the index number and collates the fingerprint image of the user with the fingerprint template when a fingerprint accepting flag is set in the second memory unit, wherein the fingerprint accepting flag is set when a fingerprint image is normally produced through the prism.

14. The system of claim 13, wherein the fingerprint accepting flag is set when the fingerprint image is generated.

15. The system of claim 13, wherein the fingerprint accepting flag is reset when the collation of the fingerprint image and the fingerprint template is complete.

16. The system of claim 13, wherein the collating unit sends the collation result to the computer.

17. The system of claim 13, wherein the second memory unit is an IC card.

18. A fingerprint collating device for collating a user's fingerprint with registered fingerprint information to effect personal authentication, said device comprising:
- an external computer;
- a prism for reading said fingerprint to create read fingerprint information, and to create a fingerprint accepting flag indicating that said read fingerprint information has been created;
- a first memory unit for storing said fingerprint accepting flag and executing a control program when receiving a collating instruction and an index number of the user from said external computer;
- a second memory unit for registering a plurality of fingerprint templates corresponding to each received index number of said registered fingerprint information;
- a controller for setting a fingerprint accepting flag associated with said read fingerprint information indicating that read fingerprint information is normally produced through said prism; and
- a collator for collating said read fingerprint information with one of said plurality of fingerprint templates corresponding to said received index number to effect personal authentication when said fingerprint accepting flag is set, and outputting a result of the authentication to said external computer, wherein said fingerprint accepting flag is reset when said collating is complete.

19. The fingerprint collating device according to claim 18, wherein said collator effects said personal authentication by using said registered fingerprint information supplied from an external storage medium, wherein said registered finger print information includes a finger print template that corresponds to an owner of the external storage medium.

* * * * *